United States Patent [19]
Hayashi

[11] Patent Number: 4,721,130
[45] Date of Patent: Jan. 26, 1988

[54] VALVE STRUCTURE OF HYDRAULIC BUFFER

[75] Inventor: Makoto Hayashi, Toyota, Japan

[73] Assignee: Toyota Jidosha Kabushiki Kaisha, Toyota, Japan

[21] Appl. No.: 941,834

[22] Filed: Dec. 15, 1986

[30] Foreign Application Priority Data

Dec. 27, 1985 [JP] Japan ................................ 60-293193

[51] Int. Cl.$^4$ .............................................. F16K 15/14
[52] U.S. Cl. ........................... 137/512.15; 137/493.8; 137/854; 137/857; 188/322.14; 188/322.15
[58] Field of Search ................ 137/512.15, 493.8, 854, 137/857; 188/282, 317, 322.14, 322.15

[56] References Cited

U.S. PATENT DOCUMENTS

| | | | |
|---|---|---|---|
| 1,967,418 | 7/1934 | McPhail | 137/854 X |
| 2,717,058 | 9/1955 | Brundrett | 188/322.15 X |
| 3,621,951 | 11/1971 | Schmid | 188/322.15 |
| 3,827,539 | 8/1974 | Fader | 137/854 X |
| 4,113,072 | 9/1978 | Palmer | 188/322.15 X |

Primary Examiner—Robert G. Nilson
Attorney, Agent, or Firm—Oblon, Fisher, Spivak, McClelland & Maier

[57] ABSTRACT

A valve structure according to the present invention is used for a hydraulic buffer provided with a member for partitioning the interior of a cylinder into two liquid chambers and having a plurality of ports for affording communication between both liquid chambers. The valve structure includes a valve body formed annularly of a leaf spring for opening and closing the ports and secured to the member on an inner peripheral portion thereof, a spring for biasing the valve body toward the member and a spring seat disposed movably between the spring and the valve body and having an abutting portion projecting toward the valve body at a side contacting the valve body. The valve body can flex about an outer peripheral edge of the abutting portion and an outer peripheral edge of the fixed portion.

2 Claims, 7 Drawing Figures

VALVE STRUCTURE OF HYDRAULIC BUFFER

BACKGROUND OF THE INVENTION

1 Field of the Invention

This invention relates to a valve structure of a hydraulic buffer and, more particularly to a valve structure of a hydraulic buffer installed in a suspension of an automobile in which preload is given to a valve body through a compression spring or the like.

2 Description of the Prior Art

As a valve structure for a member like a piston which partitions the interior of a cylinder of a hydraulic buffer into two liquid chambers and has ports affording communication between both liquid chambers, there are ones shown in FIG. 6 and disclosed in Japanese Utility Model Public Disclosure (KOKAI) No. 33842/83, for example.

The interior of a cylinder 10 of a hydraulic buffer shown in FIG. 6 is partitioned into two liquid chambers 16,18 by a piston 14 disposed movably in the cylinder 10 and connected with a piston rod 12. The piston 14 is provided with a plurality of ports 20 through which liquid flows when the piston rod 12 is extended and a plurality of ports 22 through which liquid flows when the piston rod 12 is contracted (only one port is shown respectively in FIG. 6). Both liquid chambers 16,18 communicate to each other through these ports. A valve body 24 formed of a leaf spring is disposed at the underside of the ports 20, while a valve body 26 formed of a leaf spring is disposed at the upside of the ports 22.

This hydraulic buffer is constituted such that while a damping force is produced by the flow of liquid flowing through the ports 20 to deflect the valve body 24 when the piston rod 12 is extended, any damping force is not substantially produced by the flow of liquid flowing through the ports 22 to deflect the valve body 26, when the piston rod 12 is contracted, because of same spring constant of valve body 26.

According to the hydraulic buffer disclosed in said Japanese Utility Model Public disclosure, a valve body for opening and closing ports through which liquid flows when a piston rod is extended, is formed of a leaf spring having a plurlaity of slits at a peripheral portion thereof and biased toward the piston by a compression spring to give preload to the valve body.

SUMMARY OF THE INVENTION

According to the hydraulic buffer shown in FIG. 6, since the valve body 24 gets the damping force only through the leaf spring itself, as shown B in FIG. 5, the damping force has a characteristic of becoming small in a low speed region of the piston and large in a high speed region, which is much far from an ideal characteristic A of a hydraulic buffer for a suspension of an automobile.

According to the hydraulic buffer disclosed in said Japanese Utility Model Public Disclosure, the slits of the valve body are used for orifices through which liquid flows in a low speed region of the piston. Until the force of liquid acting the ports reaches the preload due to the compression spring, the liquid flows through the slits. When the force of liquid overcomes the preload, the liquid flows while deflecting the valve body. As a result, the damping force has a characteristic C shown in FIG. 5. However, a fraction $C_1$ of the characteristic C in the so-called orifice region changes in proportion to the viscosity of liquid passing through the orifices, so that the damping force is liable to be affected by temperature and it is difficult to get a predetermined characteristic since the characteristic becomes the ideal one A or departs largely from the same according to temperature changes.

An object of the present invention is to provide a valve structure of a hydraulic buffer which is obtainable an ideal damping characteristic hardly affected by the viscosity of liquid.

Another object of the present invention is to provide a valve structure of a hydraulic buffer suited for a suspension of an automobile.

According to the present invention, there is provided a valve structure of a hydraulic buffer provided with a member for partitioning the interior of a cylinder into two liquid chambers and having at least a port affording communication between both liquid chambers. The valve structure comprises a valve body formed of a leaf spring for opening and closing said port and being capable of flexing about fulcrums which have different distances from an free end thereof, a spring for biasing the valve body toward said member and a spring seat disposed movably between the spring and said valve body.

In a preferred embodiment, the valve body is formed annularly, an outer peripheral edge of the valve body is the free end and an inner peripheral portion is fixed to the member. One of the fulcrums is provided between the fixed portion and the free end, and an outer peripheral edge of the fixed portion provides another fulcrum.

In a low speed region of a piston, liquid passing through the port flows while deflecting a portion between the free end of the valve body and the first fulcrum about said first fulcrum. Under such a condition since the effective length of the valve body is short, the spring constant is increased to produce the damping force having abrupt rise.

When the piston has high speed and the force of liquid passing through the port exceeds the preload set to the spring, liquid flows while deflecting the valve body about the second fulcrum. Under this condition the effective length of the valve body is elongated to reduce the spring constant, so that the damping force having gentle rise may be produced.

The damping force in the low speed region of the piston is produced not by orifices but by the deflection of the valve body formed of a leaf spring. Thus, the damping force may be substantially constant irrespective of the viscosity of liquid, since the loss of kinetic energy of liquid becomes substantially constant resulting from the fact that the degree of deflection of the valve body changes with the viscosity of liquid in case of the same speed of the piston. Thus, even when not only the change in the viscosity due to temperature, but also the change in the viscosity due to the degradation of liquid are produced, the damping force of a hydraulic buffer presents the approximately constant characteristic.

By changing over the spring constant of the valve body according to kinds of automobile having different piston speeds can be easily obtained an ideal characteristic of damping force.

BRIEF DESCRIPTION OF THE DRAWINGS

The other objects and features of the invention will become apparent from the following description of preferred embodiments of the invention with reference to the accompanying drawings, in which.

DETAILED DESCRIPTION OF THE PREFERRED EMBODIMENTS

Figure 6:
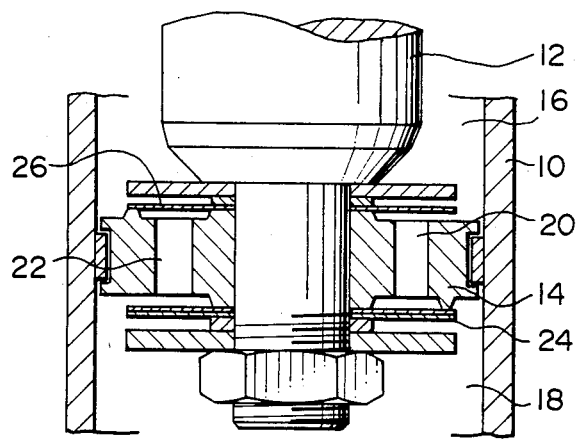
FIG. 6 is a sectonal view showing a conventional valve structure.

Parts which are substantially similar to those shown in FIG. 6 are designated by same symbols and the detailed description thereof will be omitted.

Figure 1:
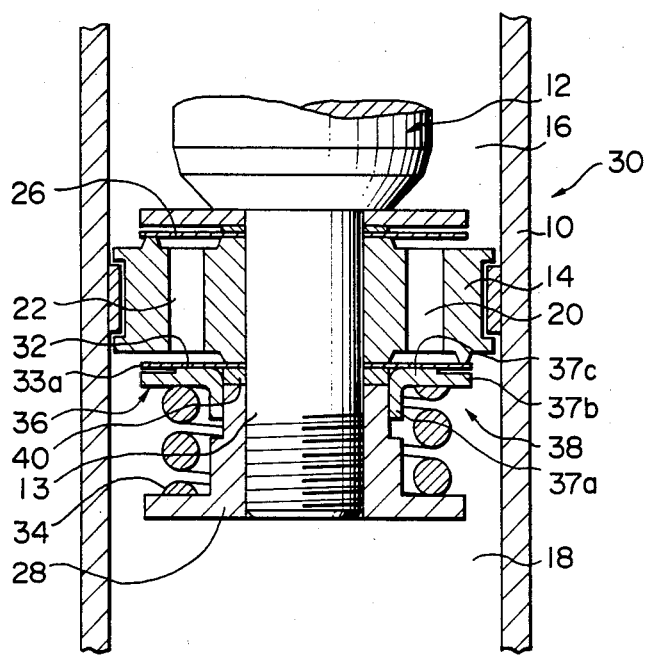
FIG. 1 is a sectional view showing a valve structure according to the present invention embodied in a piston.

In a hydraulic buffer 30 shown in FIG. 1, a piston 14 for partitioning the interior of a cylinder 10 into two liquid chambers 16,18 is coupled with an end 13 of a piston rod 12 by a nut 28, which serves also as a spring carrier. A valve body 32 for opening and closing ports 20 in the piston 14 is disposed at the underside of the piston 14. A valve structure 38 is constituted from the valve body 32, a coil spring 34 for biasing the valve body 32 toward the piston 14 and a movable spring seat 36 disposed between the spring 34 and the valve body 32.

The valve body 32 is annularly formed of a leaf spring and pressed through a sleeve 40 against the piston 14 by the nut 28 to be secured to the piston 14 at an inner peripheral portion thereof. The valve body 32 may be deflected about fulcrums which have different distances from a free end 33a of an outer peripheral portion.

In the embodiment shown in FIG. 1, the spring seat 36 has integrally a cylindrical slide portion 37a fitted movably in an upper portion of the nut 28, a carrying portion 37b bulged outward from the slide portion 37a and an abutting portion 37c projecting upward from the carrying portion 37b at the central portion thereof and contacting the valve body 32. An outer peripheral surface of the abutting portion 37c is located approximately in the center of the ports 20 and an outer peripheral edge of the abutting portion 37c provides a first fulcrum of the valve 32. Further, an outer peripheral edge of an upper surface of the sleeve 40 constitutes a second fulcrum of the valve body 32.

Figure 2:
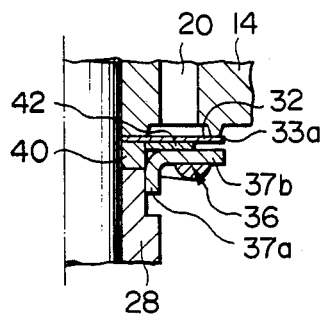
FIG. 2 is a sectional view showing principal portions of another embodiment of the valve structure.

In the embodiment shown in FIG. 2, the spring seat 36 has a slide portion 37a and a carrying portion 37b without any abutting portion projecting upward from the carrying portion 37b. On the other hand, a separate annular spacer 42 being movable along the sleeve 40 and contacting the valve body 32 is disposed between the spring seat 36 and the valve body 32. An outer peripheral surface of the spacer 42 is located approximately in the center of the ports 20 A constant depth annular space is defined by the outer peripheral surface of the spacer 42, the valve 32 and the spring seat 36. An outer peripheral edge of an upper surface of the spacer 42 provides the first fulcrum of the valve body 32. The second fulcrum of the valve body 32 is an edge of the sleeve 40 similarly to the embodiment shown in FIG. 1.

Figure 3:
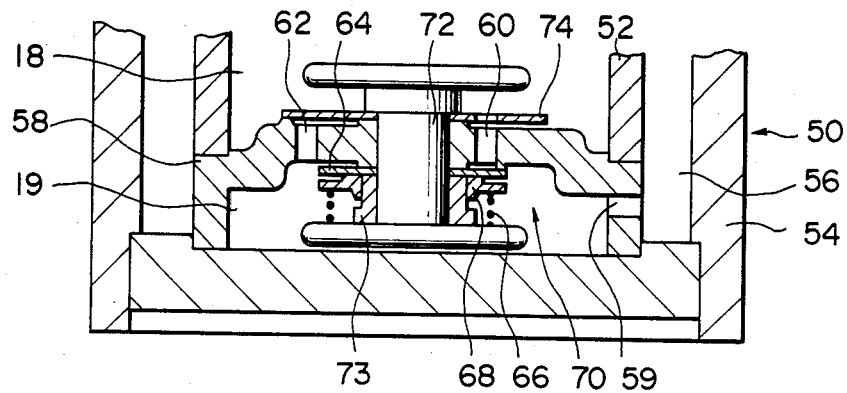
FIG. 3 is a sectional view showing the valve structure embodied in a base valve assembly.

A hydraulic buffer 50 shown in FIG. 3 is provided with inner and outer cylinders 52,54 and a space between both cylinders constitutes a chamber 56 for reserving liquid. In the interior of the cylinder 52 is disposed movably a piston similar to that shown in FIG. 1.

A base valve member 58 is fitted on the bottom of the cylinder 52 and the interior of the cylinder 52 is partitioned into two liquid chambers 18,19. The base valve member 58 is provided with a plurality of ports 60 through which liquid flows when a piston rod is contracted and a plurality of ports 62 through which liquid flows when the piston rod is extended (only one port is shown respectively in FIG. 3). Both liquid chambers 18,19 communicate to each other through these ports. Also, the liquid chamber 19 communicates to the reservoir chamber 56 through a path 59 provided in the base valve member 58.

A valve body 64 formed of a leaf spring for opening and closing the ports 60 is disposed at the underside of the base valve member 58. A valve structure 70 is constituted from the valve body 64, a coil spring 66 for biasing the valve body 64 toward the base valve member 58 and a spring seat 68 disposed between the spring 66 and the valve body 64. The valve body 64, spring 66 and spring seat 68 have respective constitutions similarly to those of the valve body 32, spring 34 and spring seat 36 shown in FIG. 1 and are secured to the base valve member 58 by a valve guide 72 and a sleeve 73. In this embodiment, the sleeve 73 has the shape different from that of the sleeve 40.

While a valve body 74 formed of a leaf spring is disposed at the upside of the ports 62, the spring constant of the leaf spring is small. Thus, in this case, the damping force is not produced here.

Model Operation

Figures 4A, 4B:
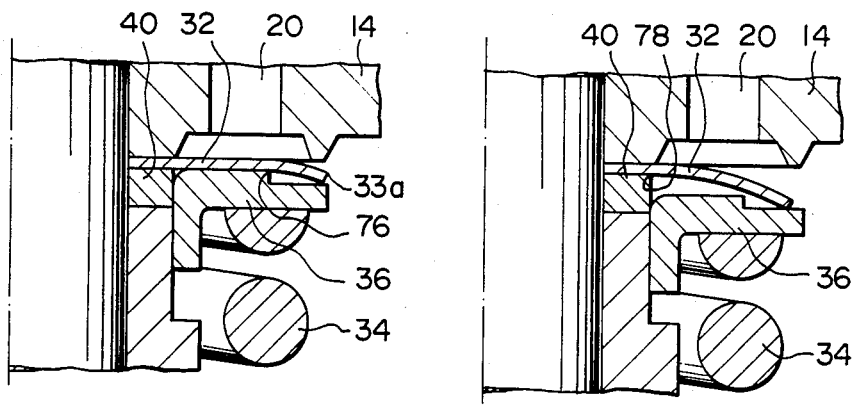
FIGS. 4(a), 4(b) are sectional views showing mode of operation of the valve structure shown in FIG. 1, respectively.
Figure 5:
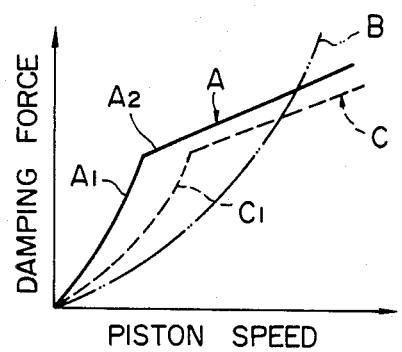
FIG. 5 is a characteristic diagram.

Liquid passing through the ports 20 in the low speed region of the piston 14 when the piston rod 12 is extended, as shown in FIG. 4(a), flows while deflecting the portion between the free end 33a of the valve body 32 and a first fulcrum 76 about said fulcrum 76. Under such condition, the effective length of the valve body 32 from the free end 33a to the first fulcrum 76 is short so that the spring constant is heightened to produce the damping force having an abrupt rise, as shown in $A_1$ of FIG. 5.

When the piston 14 has high speed and the force of liquid passing through the ports 20 exceeds the preload set to the spring 34, as shown in FIG. 4(b), the spring seat 36 is depressed so that liquid flows while deflecting the valve body 32 about a second fulcrum 78 which is the edge of the sleeve 40. Under such condition, the effective length of the valve body 32 is elongated to reduce the spring constant and then produce the damping force having gentle rise, as shown in $A_2$ of FIG. 5.

Since the characteristics $A_1$, $A_2$ of the damping force may be selected with the considerable degree of freedom according to the positions of first and second fulcrums 76,78, the characteristic A of damping force may be obtained which is sufficient in the low speed region of the piston 14 and is not too much increased in the high speed region.

What is claimed is:

1. A valve structure of a hydraulic buffer provided with a member for partitioning the interior of a cylinder into two liquid chambers and having at least a port for affording communication between both liquid chambers, comprising:

a valve body formed of a leaf spring for opening and closing said port and being capable of flexing about fulcrums which have different distances from a free end therof;

a spring for biasing the valve body toward said member;

a spring seat disposed movably between said spring and said valve body; and an annular spacer formed separately from the spring seat and disposed movably between said valve body and said spring seat, an outer diameter of the spacer being smaller than those of said valve body and spring seat, there being formed radially outwardly of the spacer and between the valve body and the spring seat an annular space having an axial depth which is substantially constant at all radial points thereof, wherein an outer peripheral edge of a surface of the spacer contacting said valve body provides one of said fulcrums.

2. A valve structure of a hydraulic buffer provided with a member for partitioning the interior of a cylinder into two liquid chambers and having at least a port for affording communication between both liquid chambers, comprising:

an annular valve body formed of a leaf spring for opening and closing said port and secured to a fixed portion of said member on an inner peripheral portion thereof;

a spring for biasing the valve body toward said member;

a spring seat disposed movably between said spring and said valve body; and an annular spacer formed separately from the spring seat and disposed movably between said valve body and said spring seat, an outer diameter of the spacer being smaller than those of said valve body and spring seat, there being formed radially outwardly of the spacer and between the valve body and the spring seat an annular space having an axial depth which is substantially constant at all radial points thereof, wherein said valve body is capable of flexing about an outer peripheral edge of a surface of the spacer contacting said valve body and about an outer peripheral edge of said fixing portion.

* * * * *